US010810718B2

(12) United States Patent
Zhou et al.

(10) Patent No.: US 10,810,718 B2
(45) Date of Patent: Oct. 20, 2020

(54) METHOD AND DEVICE FOR THREE-DIMENSIONAL RECONSTRUCTION

(71) Applicant: ArcSoft Corporation Limited, Hangzhou (CN)

(72) Inventors: Wen Zhou, Hangzhou (CN); Wei Zhou, Hangzhou (CN); Long Zhang, Hangzhou (CN)

(73) Assignee: ArcSoft Corporation Limited, Hangzhou (CN)

( * ) Notice: Subject to any disclaimer, the term of this patent is extended or adjusted under 35 U.S.C. 154(b) by 98 days.

(21) Appl. No.: 16/143,439

(22) Filed: Sep. 26, 2018

(65) Prior Publication Data

US 2019/0096050 A1 Mar. 28, 2019

(30) Foreign Application Priority Data

Sep. 27, 2017 (CN) .......................... 2017 1 0892868

(51) Int. Cl.

| | |
|---|---|
| ***G06T 5/50*** | (2006.01) |
| ***G06K 9/00*** | (2006.01) |
| ***G06T 7/593*** | (2017.01) |
| ***G06T 7/80*** | (2017.01) |
| ***G01B 11/02*** | (2006.01) |

(Continued)

(52) U.S. Cl.

CPC ................ *G06T 5/50* (2013.01); *G01B 11/02* (2013.01); *G01B 11/24* (2013.01); *G01B 11/245* (2013.01); *G06K 9/00201* (2013.01); *G06K 9/00369* (2013.01); *G06T 7/593* (2017.01); *G06T 7/62* (2017.01); *G06T 7/85* (2017.01); *G01B 2210/52* (2013.01); *G06T 2200/04* (2013.01); *G06T 2207/10028* (2013.01)

(58) Field of Classification Search

CPC ........... G01B 2210/52; G06K 9/00201; G06K 9/00369; G06T 2200/04; G06T 2207/10028; G06T 5/50

See application file for complete search history.

(56) References Cited

U.S. PATENT DOCUMENTS

2011/0210915 A1* 9/2011 Shotton .............. G06K 9/00369 345/157

2013/0100119 A1* 4/2013 Evertt ................ G06K 9/00201 345/419

(Continued)

*Primary Examiner* — David Bilodeau

(74) *Attorney, Agent, or Firm* — Osha Liang LLP

(57) ABSTRACT

The present invention provides a method and device for three-dimensional reconstruction, applied to the field of image processing. The method comprises: obtaining a first depth map, which is photographed by a first photographic device, and obtaining a second depth map, which is photographed by a second photographic device; merging the first depth map with a first three-dimensional model according to a position of the first photographic device to obtain a second three-dimensional model; and merging the second depth map with the second three-dimensional model according to a position of the second photographic device to obtain a third three-dimensional model. By adoption of the method, during the reconstruction of three-dimensional images, the reconstruction effect of the three-dimensional images of the top and the bottom of the target object can be improved, and the precision of the reconstructed three-dimensional images is improved.

8 Claims, 7 Drawing Sheets

Obtaining a first depth map, which is photographed by a first photographic device, and obtaining a second depth map, which is photographed by a second photographic device — 101

Merging the first depth map with a first three-dimensional model according to a position of the first photographic device to obtain a second three-dimensional model — 102

Merging the second depth map with the second three-dimensional model according to a position of the second photographic device to obtain a third three-dimensional model — 103

(51) Int. Cl.

| | |
|---|---|
| ***G01B 11/24*** | (2006.01) |
| ***G01B 11/245*** | (2006.01) |
| ***G06T 7/62*** | (2017.01) |

(56) References Cited

U.S. PATENT DOCUMENTS

2014/0099017 A1* 4/2014 Tsai ........................ G06T 17/00
382/154
2015/0024336 A1* 1/2015 Blassnig ................. G06T 15/06
433/29
2015/0109415 A1* 4/2015 Son ........................ G01B 11/22
348/46
2016/0084642 A1* 3/2016 Bradski ................ B65G 41/008
348/47
2016/0086017 A1* 3/2016 Rodriguez ......... G06K 9/00288
382/118
2016/0275686 A1* 9/2016 Zach ........................ G06K 9/52
2016/0284123 A1* 9/2016 Hare ......................... G06T 7/55
2017/0140578 A1* 5/2017 Xiao ....................... G06T 17/00
2017/0228885 A1* 8/2017 Baumgartner ......... G01B 11/04
2017/0372527 A1* 12/2017 Murali .................. G01S 17/894
2018/0240280 A1* 8/2018 Chen ....................... G06T 7/564
2018/0322646 A1* 11/2018 Matthies .............. G06K 9/6226
2019/0096092 A1* 3/2019 Zhou ......................... G06T 7/85

* cited by examiner

| | | | | | | | | | |
|---|---|---|---|---|---|---|---|---|---|
| -0.9 | -0.4 | -0.1 | 0.2 | 0.9 | 1 | 1 | 1 | 1 | 1 |
| -1 | -0.9 | -0.2 | 0.1 | 0.5 | 0.9 | 1 | 1 | 1 | 1 |
| -1 | -0.9 | -0.3 | 0.2 | 0.2 | 0.8 | 1 | 1 | 1 | 1 |
| -1 | -0.9 | -0.4 | 0.2 | 0.2 | 0.8 | 1 | 1 | 1 | 1 |
| -1 | -1 | -0.8 | -0.1 | 0.2 | 0.6 | 0.8 | 1 | 1 | 1 |
| -1 | -0.9 | -0.3 | -0.2 | 0.3 | 0.7 | 0.9 | 1 | 1 | 1 |
| -1 | -0.9 | -0.4 | -0.1 | 0.3 | 0.8 | 1 | 1 | 1 | 1 |
| -0.9 | -0.7 | -0.5 | 0.0 | 0.4 | 0.9 | 1 | 1 | 1 | 1 |
| -0.1 | -0.1 | -0.1 | 0.1 | 0.4 | 1 | 1 | 1 | 1 | 1 |
| 1 | 1 | 1 | 1 | 1 | 1 | 1 | 1 | 1 | 1 |

Fig. 4

METHOD AND DEVICE FOR THREE-DIMENSIONAL RECONSTRUCTION

CROSS-REFERENCE TO RELATED APPLICATIONS

This application claims priority to Chinese Patent Application No. 201710892868.0, filed on Sep. 27, 2017, which is hereby incorporated by reference in its entirety.

TECHNICAL FIELD

The present invention relates to a method and device for image processing, and specifically, relates to a method and device for three-dimensional reconstruction.

BACKGROUND

At present, research on the related technology of photographing three-dimensional images has been developed for several decades. Early devices for photographing three-dimensional images mainly adopt laser, structured light, large-scale camera arrays and other specialized sensors, the reconstruction precision of three-dimensional models is high, but the prices are very high, so that the devices are only suitable for large entities, but are not suitable for small businesses or home users. In recent years, with the development of technologies, many low-cost devices for photographing three-dimensional images have emerged, for example, a depth camera capable of automatically moving is used, such a device requires the user to rotate it multiple angles according to a voice prompt for photographing, and meanwhile the depth camera automatically moves up and down to photograph depth maps of a photographed object at all angles. Finally, the depth maps photographed at the various angles are synthesized into a complete three-dimensional model of the photographed object by using an algorithm.

The three-dimensional reconstruction method in the prior art is low in effect and low in precision on the three-dimensional reconstruction of the top and the bottom of a target object.

SUMMARY

A method and device for three-dimensional reconstruction, provided by the present invention, can solve the problems of poor effect and low precision of three-dimensional reconstruction of the top and the bottom of a target object in the prior art.

A first aspect of the present invention provides a method for calibration, comprising:

obtaining a first depth map, which is photographed by a first photographic device, and obtaining a second depth map, which is photographed by a second photographic device; merging the first depth map with a first three-dimensional model according to a position of the first photographic device to obtain a second three-dimensional model; and merging the second depth map with the second three-dimensional model according to a position of the second photographic device to obtain a third three-dimensional model.

According to the first aspect of the present invention, in a first executable mode of the first aspect of the present invention, merging the first depth map with a first three-dimensional model according to a position of the first photographic device to obtain a second three-dimensional model comprises: updating a signed distance function according to the position of the first photographic device and the first depth map to obtain a first signed distance function, wherein the first signed distance function comprises the second three-dimensional model; and merging the second depth map with the second three-dimensional model according to a position of the second photographic device comprises: updating the first signed distance function according to the position of the second photographic device and the second depth map to obtain a second signed distance function, wherein the second signed distance function comprises the third three-dimensional model.

According to the first aspect of the present invention or the first executable mode of the first aspect of the present invention, in a second executable mode of the first aspect of the present invention, the position of at least one of the first photographic device and the second photographic device is obtained according to a calibration result.

According to the first aspect of the present invention or the first executable mode or the second executable mode of the first aspect of the present invention, in a third executable mode of the first aspect of the present invention, the position of the second photographic device is calculated by the following method: obtaining an initial position of the second photographic device according to the position of the first photographic device and a relative position between the second photographic device and the first photographic device; and performing alignment on the second depth map and the second three-dimensional model according to an initial position of the first photographic device by using an iterative closest point algorithm to obtain the position of the second photographic device.

A second aspect of the present invention provides a method for measurement, comprising: obtaining a three-dimensional model of a measured object; fitting a pre-stored measured three-dimensional model to the three-dimensional model of the measured object; and measuring the three-dimensional model of the measured object according to the measured three-dimensional model and the fitting process.

According to the second aspect of the present invention, in a first executable mode of the second aspect of the present invention, the pre-stored measured three-dimensional model comprise feature measurement markers; and measuring the three-dimensional model of the measured object according to the measured three-dimensional model and the fitting process comprises: measuring the three-dimensional model of the measured object according to the feature measurement markers and transformation corresponding to the fitting.

According to the first executable mode of the second aspect of the present invention, in a second executable mode of the second aspect of the present invention, the measured object is a human body; the feature measurement markers are marking points of the pre-stored measured three-dimensional model, and one or more feature measurement markers are located on a to-be-measured body circumference of the measured three-dimensional model; and measuring the three-dimensional model of the measured object according to the feature measurement markers and transformation corresponding to the fitting comprises: calculating fitted heights of the one or more feature measurement markers after the fitting according to the heights of the feature measurement markers on the measured three-dimensional model and the transformation corresponding to the fitting, obtaining an envelope curve located on the fitted heights on the three-dimensional model of the measured human body, and measuring the length of the envelope curve, wherein the length of the envelope curve is the value of the to-be-measured body circumference of the three-dimensional model of the human body.

According to the first executable mode of the second aspect of the present invention, in a third executable mode of the second aspect of the present invention, the measured object is a human body; the feature measurement markers are an envelope curve of a to-be-measured body circumference of the measured three-dimensional model; and measuring the three-dimensional model of the measured object according to the feature measurement markers and transformation corresponding to the fitting comprises: calculating the length of the above-mentioned envelope curve after fitting according to the envelope curve of the to-be-measured body circumference of the measured three-dimensional model and the transformation corresponding to the fitting, wherein the length of the envelope curve is the value of the to-be-measured body circumference of the three-dimensional model of the human body.

According to the second executable mode or third executable mode of the second aspect of the present invention, in a fourth executable mode of the second aspect of the present invention, the to-be-measured body circumference comprises at least one of a chest circumference, a waistline and a hip circumference.

According to the second aspect of the present invention or any executable mode of the first executable mode to the fourth executable mode of the second aspect of the present invention, in a fifth executable mode of the second aspect of the present invention, the measured object is a human body; and the fitting comprises at least one of pose fitting and shape fitting.

A third aspect of the present invention provides a device for three-dimensional reconstruction, comprising: a first obtaining module, configured to obtain a first depth map, which is photographed by a first photographic device, and obtain a second depth map, which is photographed by a second photographic device; a calculation module, configured to merge the first depth map with a first three-dimensional model according to a position of the first photographic device to obtain a second three-dimensional model; and the calculation module is further configured to merge the second depth map with the second three-dimensional model according to a position of the second photographic device to obtain a third three-dimensional model.

According to the third aspect of the present invention, in a first executable mode of the third aspect of the present invention, the calculation module is specifically configured to update a signed distance function according to the position of the first photographic device and the first depth map to obtain a first signed distance function, wherein the first signed distance function comprises the second three-dimensional model; and the calculation module is specifically configured to update the first signed distance function according to the position of the second photographic device and the second depth map to obtain a second signed distance function, wherein the second signed distance function comprises the third three-dimensional model.

According to the third aspect of the present invention or the first executable mode or the second executable mode of the third aspect of the present invention, in a third executable mode of the third aspect of the present invention, the calculation module is specifically configured to obtain an initial position of the second photographic device according to the position of the first photographic device and a relative position between the second photographic device and the first photographic device, and perform alignment on the second depth map and the second three-dimensional model according to an initial position of the first photographic device by using an iterative closest point algorithm to obtain the position of the second photographic device.

A fourth aspect of the present invention provides a device for measurement, comprising: a second obtaining module, configured to obtain a three-dimensional model of a measured object; a fitting module, configured to fit a pre-stored measured three-dimensional model to the three-dimensional model of the measured object; and a measurement module, configured to measure the three-dimensional model of the measured object according to the measured three-dimensional model and the fitting process.

According to the fourth aspect of the present invention, in a first executable mode of the fourth aspect of the present invention, the pre-stored measured three-dimensional model comprises feature measurement markers; and the measurement module is specifically configured to measure the three-dimensional model of the measured object according to the feature measurement markers and transformation corresponding to the fitting.

According to the first executable mode of the fourth aspect of the present invention, in a second executable mode of the fourth aspect of the present invention, the measured object is a human body; the feature measurement markers are marking points of the pre-stored measured three-dimensional model, and one or more feature measurement markers are located on a to-be-measured body circumference of the measured three-dimensional model; and the measurement module is specifically configured to calculate fitted heights of the one or more feature measurement markers after the fitting according to the heights of the feature measurement markers on the measured three-dimensional model and the transformation corresponding to the fitting, obtain an envelope curve located on the fitted heights on the three-dimensional model of the measured human body, and measure the length of the envelope curve, wherein the length of the envelope curve is the value of the to-be-measured body circumference of the three-dimensional model of the human body.

According to the first executable mode of the fourth aspect of the present invention, in a third executable mode of the fourth aspect of the present invention, the measured object is a human body; the feature measurement markers are an envelope curve of a to-be-measured body circumference of the measured three-dimensional model; and the measurement module is specifically configured to calculate the length of the above-mentioned envelope curve after the fitting according to the envelope curve of the to-be-measured body circumference of the measured three-dimensional model and the transformation corresponding to the fitting, wherein the length of the envelope curve is the value of the to-be-measured body circumference of the three-dimensional model of the human body.

According to the second executable mode or third executable mode of the fourth aspect of the present invention, in a fourth executable mode of the fourth aspect of the present invention, the to-be-measured body circumference comprises at least one of a chest circumference, a waistline and a hip circumference.

According to the fourth aspect of the present invention or any executable mode of the first executable mode to the fourth executable mode of the fourth aspect of the present invention, in a fifth executable mode of the fourth aspect of the present invention, the measured object is a human body; and the fitting comprises at least one of pose fitting and shape fitting.

A fifth aspect of the present invention provides a computer readable storage medium, which stores a computer program, wherein the computer program, when executed by a first processor, implements the steps of the method in the first aspect of the present invention, any executable mode of the first executable mode of the first aspect of the present invention to the third executable mode of the first aspect of the present invention, the second aspect of the present invention, or any executable mode of the first executable mode of the second aspect of the present invention to the fifth executable mode of the second aspect of the present invention.

A sixth aspect of the present invention provides a device for calibration, comprising: a memory, a second processor and a computer program which is stored in the memory and can be run on the second processor, wherein the computer program, when executed by the second processor, implements the steps of the method in the first aspect of the present invention, any executable mode of the first executable mode of the first aspect of the present invention to the third executable mode of the first aspect of the present invention, the second aspect of the present invention, and any executable mode of the first executable mode of the second aspect of the present invention to the fifth executable mode of the second aspect of the present invention.

By adoption of the method and device for three-dimensional reconstruction provided by the present invention, during the reconstruction of three-dimensional images, the reconstruction effect of the three-dimensional images of the top and the bottom of the target object can be improved, and the precision of the reconstructed three-dimensional images is improved.

BRIEF DESCRIPTION OF DRAWINGS

FIG. 4 is a flow diagram of representing a human face by using a two-dimensional signed distance function provided by embodiment 1 of the present invention;

DESCRIPTION OF EMBODIMENTS

Figure 1:
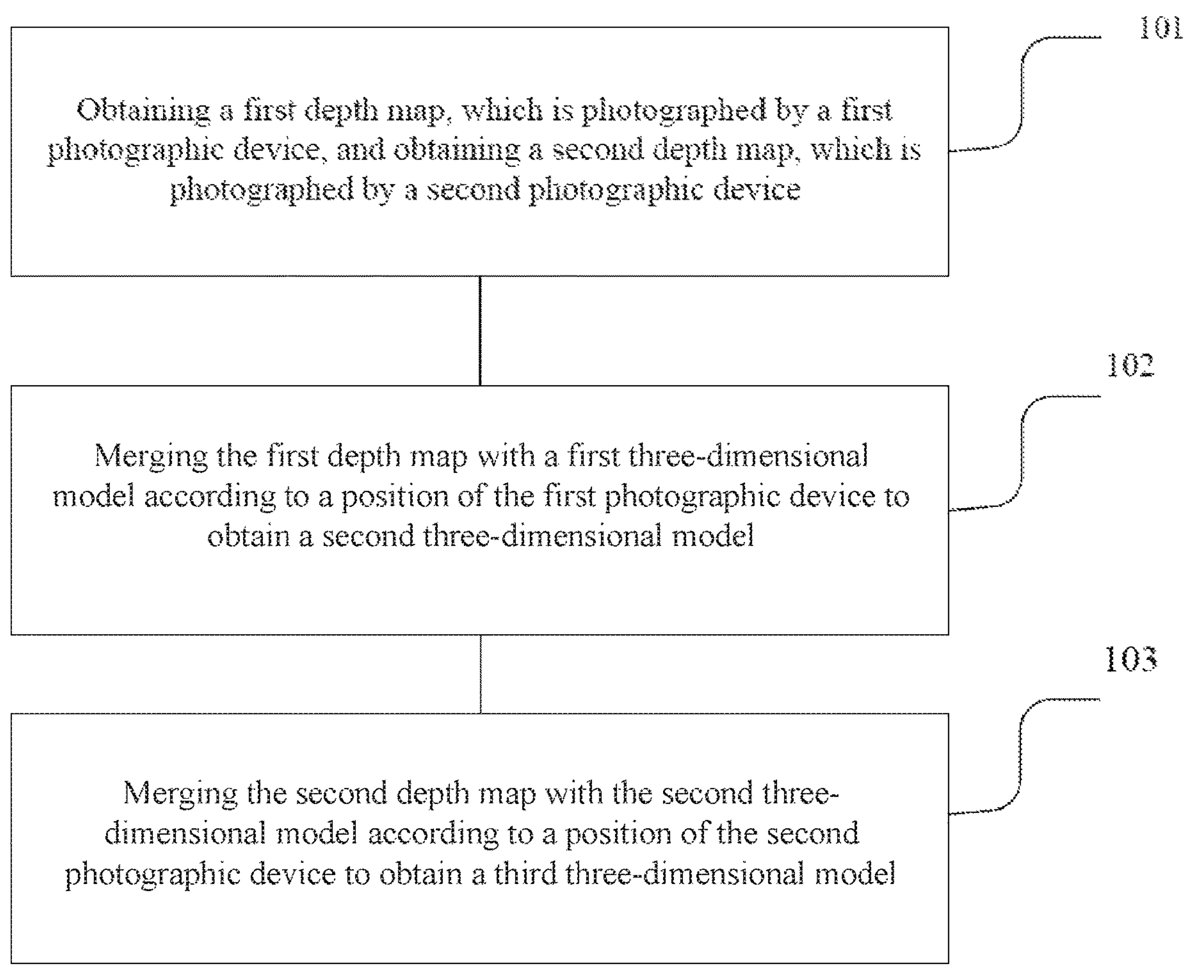
FIG. 1 is a flow diagram of a method for three-dimensional reconstruction provided by embodiment 1 of the present invention.

The technical solutions in the embodiments of the present invention will be described in detail below in combination with the accompanying drawings in the embodiments of the present invention.

The terms "first", "second" and the like in the specification, claims and drawings of the present invention are used for distinguishing different objects, rather than limiting specific sequences.

The term "and/or" in the embodiments of the present invention is merely a correlation for describing correlated objects, and indicates three possible relations, e.g., A and/or B may indicate three situations: only A exists, both A and B exist, and only B exists.

In the embodiments of the present invention, the words such as "exemplary" or "for example" are used for indicating an example or an illustrative example or illustration. Any embodiment or design scheme described as "exemplary" or "for example" in the embodiments of the present invention should not be interpreted as being more preferable or more advantageous than other embodiments or design schemes. Exactly, the words such as "exemplary" or "for example" are used for presenting relevant concepts in specific manners.

It should be noted that, for the sake of brevity and clearness of the drawings, the components shown in the drawings do not need to be drawn to scale. For example, for the sake of clearness, the sizes of some components can be increased relative to other components. In addition, reference signs can be repeated, where appropriate, among the drawings to indicate corresponding or similar components in view of this.

A method for three-dimensional reconstruction provided by embodiment 1 of the present invention is illustrated below in detail in combination with FIG. 1. As shown in FIG. 1, the method comprises:

Step 101, obtaining a first depth map, which is photographed by a first photographic device, and obtaining a second depth map, which is photographed by a second photographic device.

Optionally, the first depth map and/or the second depth map described above may be obtained from a storage device, which may be an RAM (Random Access Memory), a flash memory or the like. Optionally, the first photographic device and/or the second photographic device may be a depth photographic device. The sequence of obtaining the first depth map and obtaining the second depth map described above is not limited, the first depth map may be obtained first and then the second depth map is obtained, or vice versa.

Step 102, merging the first depth map with a first three-dimensional model according to a position of the first photographic device to obtain a second three-dimensional model.

Step 103, merging the second depth map with the second three-dimensional model according to a position of the second photographic device to obtain a third three-dimensional model.

Optionally, merging the first depth map with a first three-dimensional model according to a position of the first photographic device to obtain a second three-dimensional model comprises: updating a signed distance function according to the position of the first photographic device and the first depth map to obtain a first signed distance function, wherein the first signed distance function comprises the second three-dimensional model; and merging the second depth map with the second three-dimensional model according to a position of the second photographic device comprises: updating the first signed distance function according to the position of the second photographic device and the second depth map to obtain a second signed distance function, wherein the second signed distance function comprises the third three-dimensional model.

Optionally, merging the first depth map with a first three-dimensional model according to a position of the first photographic device to obtain a second three-dimensional model may comprise: if the first three-dimensional model is represented by a point cloud, performing alignment on the depth map and the point cloud according to the position of the first photographic device to obtain the second three-dimensional model.

Optionally, the position of at least one of the first photographic device and the second photographic device is obtained according to a calibration result.

Optionally, the position of the second photographic device is calculated by the following method: obtaining an initial position of the second photographic device according to the position of the first photographic device and a relative position between the second photographic device and the first photographic device; and performing alignment on the second depth map and the second three-dimensional model according to an initial position of the first photographic device by using an iterative closest point algorithm to obtain the position of the second photographic device.

Optionally, the position of the first photographic device described above may be represented by a transformation matrix of a coordinate system of the first photographic device relative to the coordinate system of the reconstructed three-dimensional model, and this is also the case for the second photographic device. Optionally, the transformation matrix may be obtained by calibration, and may also be calculated from the transformation matrix relative to the calibrated photographic device and the position of the calibrated photographic device. For example, when the position of the first photographic device is known by calibration, and the relative position, namely relative position, of the second photographic device relative to the first photographic device is obtained, and then the position of the second photographic device relative to the reconstructed three-dimensional model may be obtained.

Figure 2:
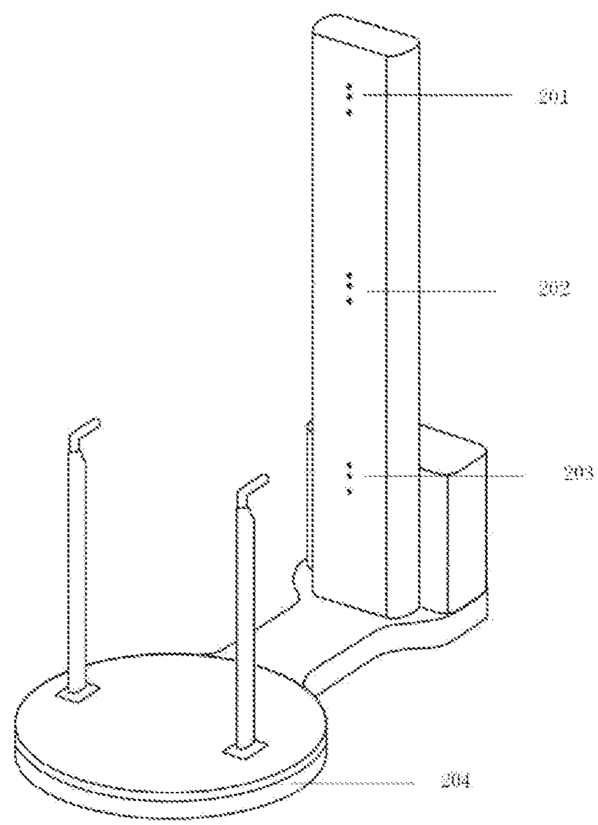
FIG. 2 is a schematic diagram of a device for three-dimensional reconstruction provided by embodiment 1 of the present invention.

Specifically, exemplarily, as shown in FIG. 2, FIG. 2 shows a device for three-dimensional reconstruction that can use the method of the present invention. 201, 202 and 203 respectively comprise depth photographic devices for photographing depth maps.

Optionally, the above-mentioned three-dimensional reconstruction method may also be accomplished by using two depth photographic devices, for example, 201 represents the first photographic device, and 202 represents the second photographic device. 204 represents a turntable for placing a measured object.

Figure 3:
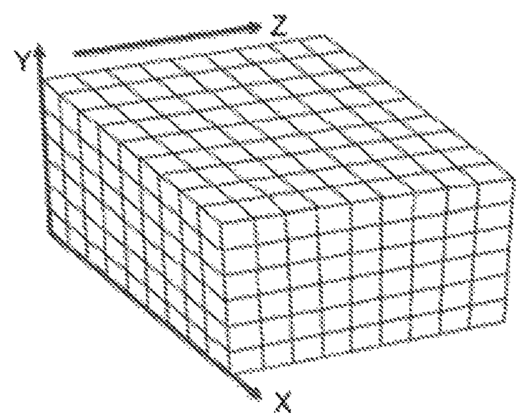
FIG. 3 is a schematic diagram of a signed distance function provided by embodiment 1 of the present invention.

In the present invention, a signed distance function (SDF) may be used to represent a currently reconstructed three-dimensional model: a to-be-scanned area is evenly divided into a series of small cubes (voxels), each voxel records a signed distance from the reconstructed three-dimensional model, the signed distances of the voxels inside the object are negative, the signed distances of the voxels outside the object are positive, and the signed distances of the surfaces of the object are zero. Therefore, one signed distance function comprises a three-dimensional model. As shown in FIGS. 3 and 4, FIG. 3 shows a signed distance function comprising a series of voxels, and FIG. 4 shows a schematic diagram representing a human face in a two-dimensional direction by using the signed distance function, the signed distances are all positive from the reconstructed three-dimensional model to the side of the camera are positive, and are all negative to the other side, the greater the distance from a grid point to the reconstructed three-dimensional model is, the greater the absolute value is, and crossing points from positive to negative in the grid represent the surfaces of the reconstructed three-dimensional model, in this way, the signed distance function can represent the reconstructed three-dimensional model. When the depth map is merged with the three-dimensional model, the values of corresponding voxels in the above-mentioned signed distance function are updated via the obtained at least one depth map of different angle to accomplish the above-mentioned merging. Optionally, the corresponding relation between the pixels in the depth map and the above-mentioned voxels may be obtained via the relation between the coordinate system of the photographic device and the coordinate system of the reconstructed three-dimensional model.

In the present invention, at least two depth photographic devices share a unified signed distance function, and the visual domain of each depth photographic device covers a part of the signed distance function. There is an intersection between the visual domains of the photographic device 202 in the middle and the photographic device 201 at the upper side, and/or between the visual domains of the photographic device 202 in the middle and the photographic device 203 at the lower side. Such design not only ensures the smooth execution of the tracing algorithm of the photographic devices, but also avoids the mutual interference between the depth photographic devices as much as possible.

Figure 5:
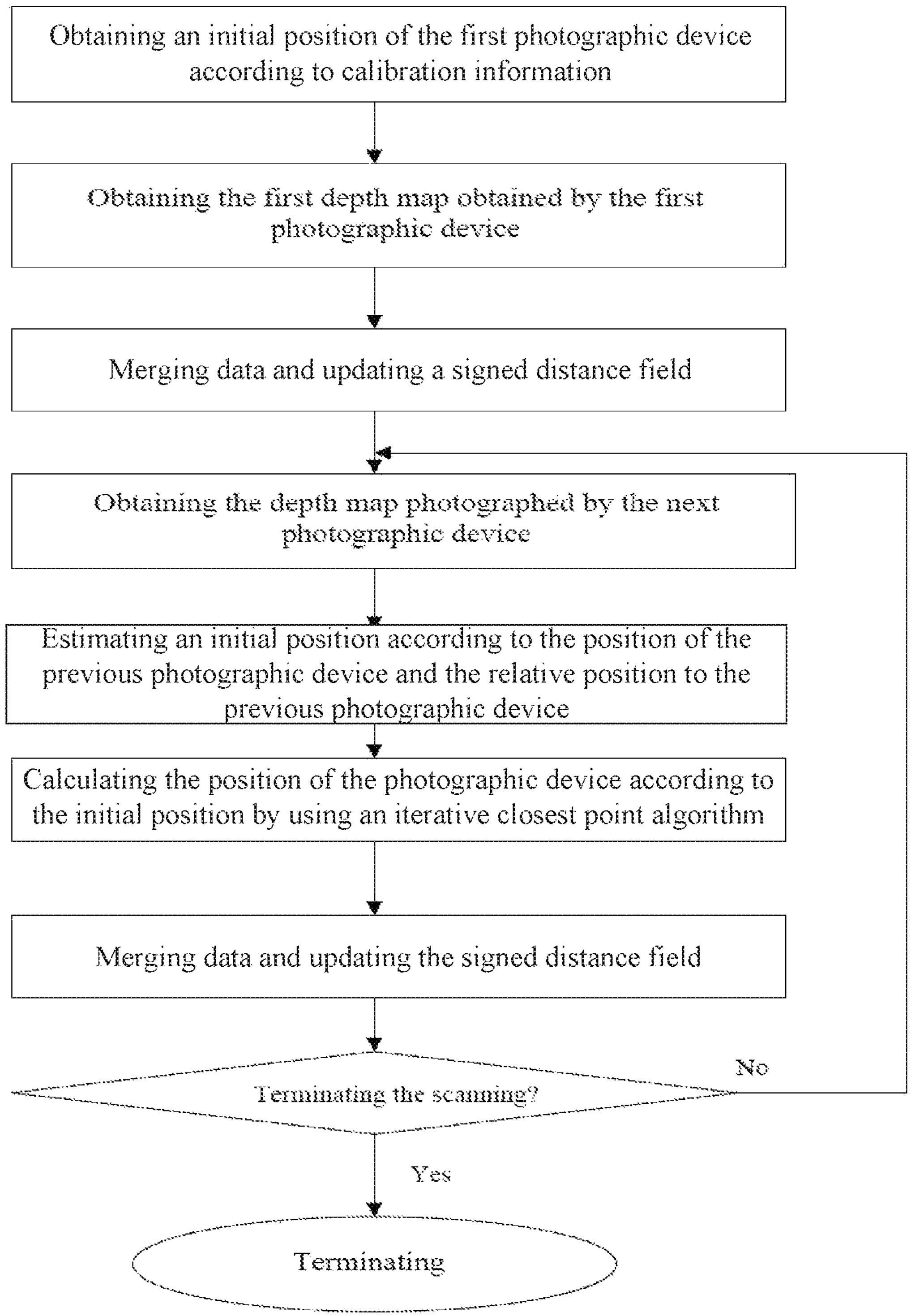
FIG. 5 is a flow diagram of another method for three-dimensional reconstruction provided by embodiment 1 of the present invention.

As shown in FIG. 5, the method for obtaining the three-dimensional model via two or more depth photographic devices is specifically described below by using the three depth photographic devices in FIG. 2. Optionally, the sequence of merging the depth maps photographed by the above-mentioned three depth photographic devices may be from the depth map photographed by the 201 to the depth map photographed by the 202 to the depth map photographed by the 203, and may also be 202→203→201, and this is not limited in the present invention. With the sequence of 201→202→203 as an example, the first depth map photographed by the first photographic device 201 is obtained, the initial position of the camera 201 is obtained according to the calibration result, and the signed distance function is updated according to the position. The sequence of obtaining the depth map and calculating the position can be reversed, which is not limited in the present invention.

Then, the second depth map photographed by the second photographic device 202 is obtained, the initial position of the second photographic device 202 is calculated according to the position of the first photographic device 201, and the relative position between the first photographic device 201 and the second photographic device 202 obtained during the calibration, and then ICP alignment is performed on the depth map obtained by the second photographic device 202 and the updated signed distance function described above by using an ICP algorithm to obtain the position of the second photographic device 202, and the signed distance function is updated according to the position. In this way, the depth maps photographed by the three depth photographic devices are read in turn to continuously improve the three-dimensional model. Optionally, every time after the position of the current depth photographic device is estimated, it is determined whether one rotation has been performed to serve as the determination condition of automatic termination.

By adoption of the method for three-dimensional reconstruction provided by the embodiment of the present invention, during the reconstruction of three-dimensional images, the reconstruction effect of the three-dimensional images of the top and the bottom of the target object can be improved, and the precision of the reconstructed three-dimensional images is improved.

Figure 6:
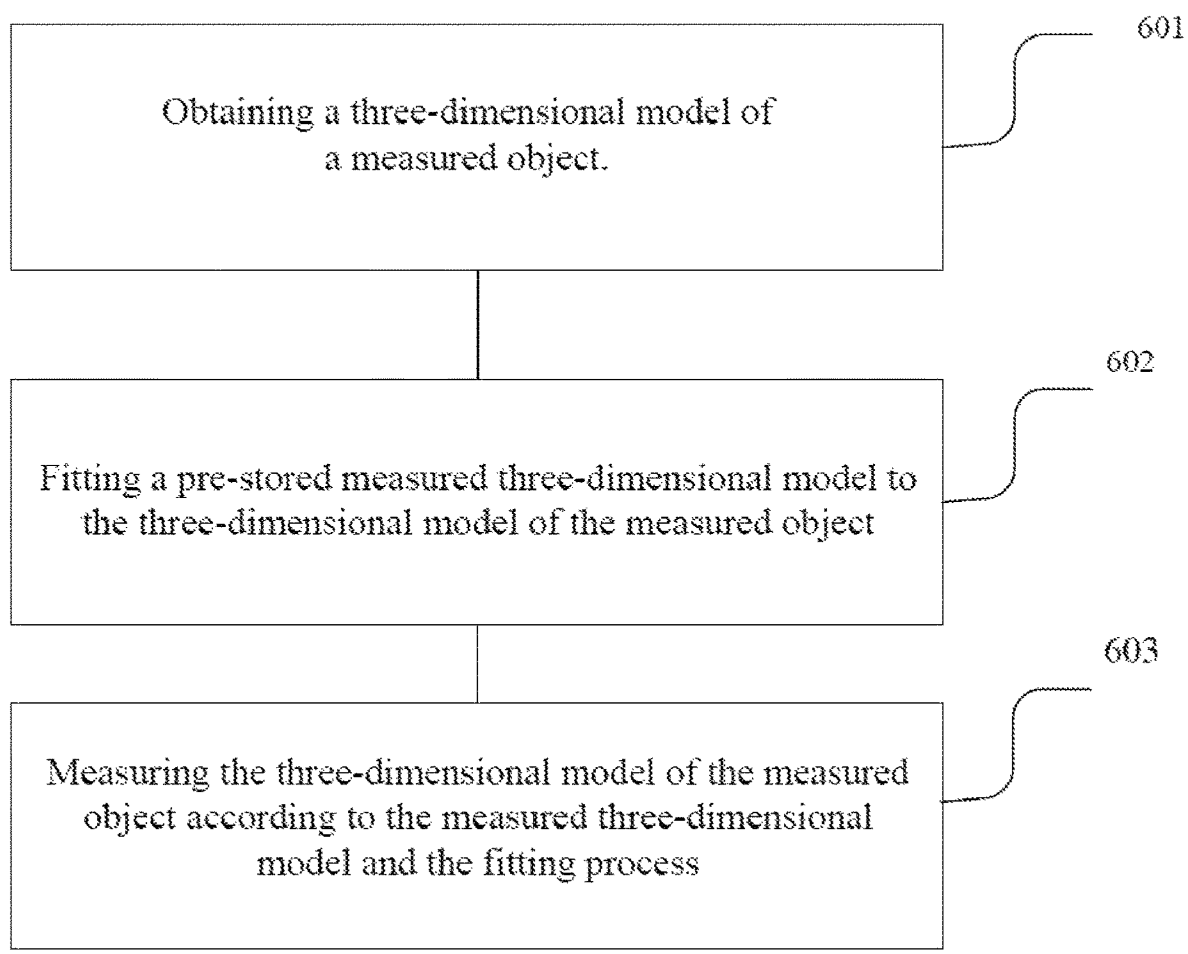
FIG. 6 is a flow diagram of a method for measurement provided by embodiment 2 of the present invention.

A method for measurement provided by embodiment 2 of the present invention is illustrated below in detail in combination with FIG. 6. As shown in FIG. 6, the method comprises:

Step 601, obtaining a three-dimensional model of a measured object.

Optionally, the measured object may be a human body.

Step 602, fitting a pre-stored measured three-dimensional model to the three-dimensional model of the measured object.

Optionally, the measured object is a human body, and the fitting comprises at least one of pose fitting and shape fitting.

Step 603, measuring the three-dimensional model of the measured object according to the measured three-dimensional model and the fitting process.

Optionally, the pre-stored measured three-dimensional model comprise feature measurement markers; and measuring the three-dimensional model of the measured object according to the measured three-dimensional model and the fitting process comprises: measuring the three-dimensional model of the measured object according to the feature measurement markers and transformation corresponding to the fitting.

Optionally, the measured object is a human body; the feature measurement markers are marking points of the pre-stored measured three-dimensional model, and one or more feature measurement markers are located on a to-be-measured body circumference of the measured three-dimensional model; and measuring the three-dimensional model of the measured object according to the feature measurement markers and transformation corresponding to the fitting comprises: calculating fitted heights of the one or more feature measurement markers after the fitting according to the heights of the feature measurement markers on the measured three-dimensional model and the transformation corresponding to the fitting, obtaining an envelope curve located on the fitted heights on the three-dimensional model of the measured human body, and measuring the length of the envelope curve, wherein the length of the envelope curve is the value of the to-be-measured body circumference of the three-dimensional model of the human body. Optionally, the above-mentioned marking point may have a mark number, and the marking point on the to-be-measured body circumference after the fitting may be found via the above-mentioned mark number.

Optionally, the measured object is a human body; the feature measurement markers are an envelope curve of a to-be-measured body circumference of the measured three-dimensional model; and measuring the three-dimensional model of the measured object according to the feature measurement markers and transformation corresponding to the fitting comprises: calculating the length of the above-mentioned envelope curve after fitting according to the envelope curve of the to-be-measured body circumference of the measured three-dimensional model and the transformation corresponding to the fitting, wherein the length of the envelope curve is the value of the to-be-measured body circumference of the three-dimensional model of the human body.

Optionally, feature measurement markers with different shapes may be designed according to different measurement applications, for example, a feature measurement marker may also be a linear segment, a curve segment, etc.

Specifically, a three-dimensional human body database is obtained by collecting a large number of human body models of different body types. These human body models are collected at the same standard pose, and the three-dimensional human body database may be formed by one measured three-dimensional model and several feature vectors. In this way, one human body model may be represented as a linear combination of the measured three-dimensional model and the feature vectors.

The human body fitting process may be: inputting a human body scanning model, iteratively performing pose fitting and/or shape fitting according to the three-dimensional human body database until convergence, such as: the fitting error is reduced to a fixed range. The above fitting process corresponds to a transformation matrix.

Simply put, the pose fitting is used for describing the overall shape of the human body, for example the arms splay to both sides or are akimbo and so on. In order to represent the human bodies in different poses, a skeleton may be added to the human body database, and the skeleton drives the stored three-dimensional model to be transformed from a standard pose to other pose. The skeleton is a simplified version of human body skeletons and is composed of a number of joint points, each of which is connected with a number of other joint points. The pose fitting (or pose estimation) may also refer to estimating the pose (comprising three-dimensional spatial position and rotation angle) of the joint point according to the reconstructed three-dimensional model.

The shape fitting may refer to estimating the shape of the surfaces of the three-dimensional model according to the reconstructed three-dimensional model, which reflects the degree of body fatness, the degree of different muscles, and the like. Optionally, the shape fitting may adopt a principal component analysis (PCA) method. Optionally, the shape fitting may be performed after the pose fitting.

Optionally, the measurement of the measured object may be the body circumference measurement of the human body, for example, chest circumference, hip circumference and/or waistline. For example, when the chest circumference is measured, feature measurement marking points on a chest circumference line of the measured three-dimensional model are recorded. After the human body fitting, the fitted heights of these feature measurement marking points are calculated on the three-dimensional model obtained by fitting, and a parallel surface of the fitted heights is crossed with a scanned trunk position of the three-dimensional model of the measured human body to obtain the envelope curve of the cross section, and the obtained envelope curve of the cross section is a measured chest circumference value.

Compared with the method of finding feature points in the prior, the method disclosed by the embodiment of the present invention has the advantages that the measurement method based on fitting of the present invention is high in speed, stable and reliable in result and high in expandability.

Figure 7:
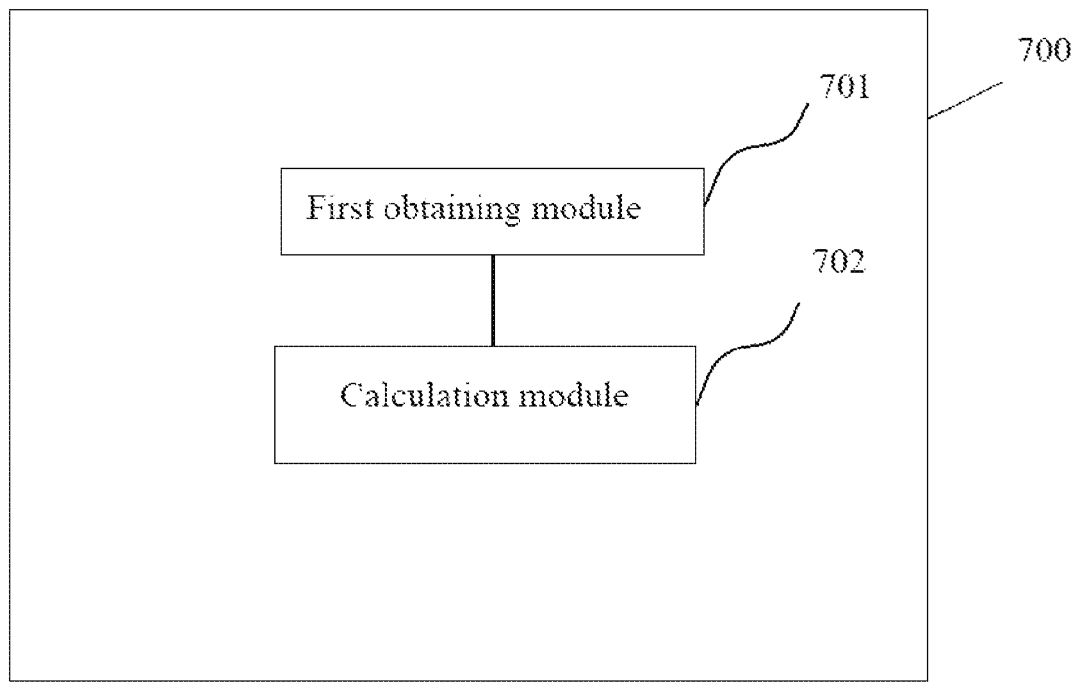
FIG. 7 is a structural schematic diagram of a device for three-dimensional reconstruction provided by embodiment 3 of the present invention.

A device for three-dimensional reconstruction provided by embodiment 3 of the present invention is illustrated below in detail in combination with FIG. 7. As shown in FIG. 7, the device comprises: a first obtaining module 701 and a calculation module 702, the first obtaining module 701 is configured to obtain a first depth map, which is photographed by a first photographic device, and obtain a second depth map, which is photographed by a second photographic device.

Optionally, the first depth map and/or the second depth map described above may be obtained from a storage device, which may be an RAM (Random Access Memory), a flash memory or the like. Optionally, the first photographic device and/or the second photographic device may be a depth photographic device. The sequence of obtaining the first depth map and obtaining the second depth map described above is not limited, the first depth map may be obtained first and then the second depth map is obtained, or vice versa.

The calculation module 702 is configured to merge the first depth map with a first three-dimensional model according to a position of the first photographic device to obtain a second three-dimensional model; and the calculation module 702 is further configured to merge the second depth map with the second three-dimensional model according to a position of the second photographic device to obtain a third three-dimensional model.

Optionally, the first three-dimensional model may be represented by a point cloud. The calculation module 702 is further configured to perform alignment on the depth map and the point cloud according to the position of the first photographic device to obtain the second three-dimensional model.

Optionally, the calculation module 701 is specifically configured to update a signed distance function according to the position of the first photographic device and the first depth map to obtain a first signed distance function, wherein the first signed distance function comprises the second three-dimensional model; and the calculation module 702 is specifically configured to update the first signed distance function according to the position of the second photographic device and the second depth map to obtain a second signed distance function, wherein the second signed distance function comprises the third three-dimensional model.

Optionally, the position of at least one of the first photographic device and the second photographic device is obtained according to a calibration result.

Optionally, the calculation module 702 is specifically configured to obtain an initial position of the second photographic device according to the position of the first photographic device and a relative position between the second photographic device and the first photographic device, and perform alignment on the second depth map and the second three-dimensional model according to an initial position of the first photographic device by using an iterative closest point algorithm to obtain the position of the second photographic device Optionally, the position of the first photographic device described above may be represented by a transformation matrix of a coordinate system of the first photographic device relative to the coordinate system of the reconstructed three-dimensional model, and this is also the case for the second photographic device. Optionally, the transformation matrix may be obtained by calibration, and may also be calculated from the transformation matrix relative to the calibrated photographic device and the position of the calibrated photographic device. For example, when the position of the first photographic device is known by calibration, and the relative position, namely relative position, of the second photographic device relative to the first photographic device is obtained, and then the position of the second photographic device relative to the reconstructed three-dimensional model may be obtained.

With respect to description of specific functions and/or structures of the device, reference may be made to the related description of FIGS. 2 to 5 in embodiment 1.

By adoption of the device for three-dimensional reconstruction provided by the embodiment of the present invention, during the reconstruction of three-dimensional images, the reconstruction effect of the three-dimensional images of the top and the bottom of the target object can be improved, and the precision of the reconstructed three-dimensional images is improved.

Figure 8:
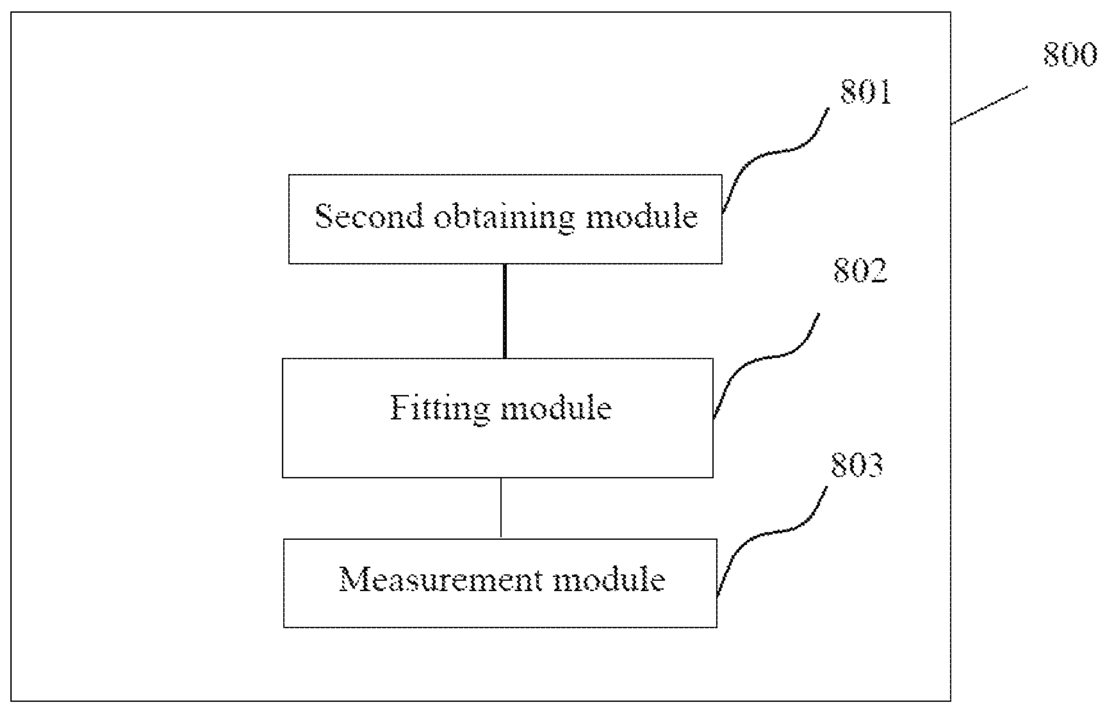
FIG. 8 is a structural schematic diagram of a device for measurement provided by embodiment 4 of the present invention.

A device for measurement provided by embodiment 4 of the present invention is illustrated below in detail in combination with FIG. 8. As shown in FIG. 8, the device comprises: a second obtaining module 801, a fitting module 802 and a measurement module 803.

The second obtaining module 801 is configured to obtain a three-dimensional model of a measured object.

Optionally, the measured object may be a human body.

The fitting module 802 is configured to fit a pre-stored measured three-dimensional model to the three-dimensional model of the measured object.

Optionally, the measured object is a human body, and the fitting comprises at least one of pose fitting and shape fitting.

The measurement module 803 is configured to measure the three-dimensional model of the measured object according to the measured three-dimensional model and the fitting process.

Optionally, the pre-stored measured three-dimensional model comprises feature measurement markers; and the measurement module 803 is specifically configured to measure the three-dimensional model of the measured object according to the feature measurement markers and transformation corresponding to the fitting.

Optionally, the measured object is a human body; the feature measurement markers are marking points of the pre-stored measured three-dimensional model, and one or more feature measurement markers are located on a to-be-measured body circumference of the measured three-dimensional model; and the measurement module 803 is specifically configured to calculate fitted heights of the one or more feature measurement markers after the fitting according to the heights of the feature measurement markers on the measured three-dimensional model and the transformation corresponding to the fitting, obtain an envelope curve located on the fitted heights on the three-dimensional model of the measured human body, and measure the length of the envelope curve, wherein the length of the envelope curve is the value of the to-be-measured body circumference of the three-dimensional model of the human body. Optionally, the above-mentioned marking point may have a mark number, and the marking point on the to-be-measured body circumference after the fitting may be found via the above-mentioned mark number.

Optionally, the measured object is a human body; the feature measurement markers are an envelope curve of a to-be-measured body circumference of the measured three-dimensional model; and the measurement module 803 is specifically configured to calculate the length of the above-mentioned envelope curve after the fitting according to the envelope curve of the to-be-measured body circumference of the measured three-dimensional model and the transformation corresponding to the fitting, wherein the length of the envelope curve is the value of the to-be-measured body circumference of the three-dimensional model of the human body.

Specifically, a three-dimensional human body database is obtained by collecting a large number of human body models of different body types. These human body models are collected at the same standard pose, and the three-dimensional human body database may be formed by one measured three-dimensional model and several feature vectors. In this way, one human body model may be represented as a linear combination of the measured three-dimensional model and the feature vectors.

The human body fitting process may be: inputting a human body scanning model, iteratively performing pose fitting and/or shape fitting according to the three-dimensional human body database until convergence, such as: the fitting error is reduced to a fixed range. The above fitting process corresponds to a transformation matrix.

Simply put, the pose fitting is used for describing the overall shape of the human body, for example the arms are splay both sides or are akimbo and so on. In order to represent the human bodies in different poses, a skeleton may be added to the human body database, and the skeleton drives the stored three-dimensional model to be transformed from a standard pose to other poses. The skeleton is a simplified version of human body skeletons and is composed of a number of joint points, each of which is connected with a number of other joint points. The pose fitting (or pose estimation) may also refer to estimating the pose (comprising three-dimensional spatial position and rotation angle) of the joint point according to the reconstructed three-dimensional model. For example, parameters representing the positions of the above-mentioned joint points and the rotating directions of the joint points are defined, and values of the parameters representing the positions of the above-mentioned joint points and the rotating directions of the joint points are determined according to the reconstructed three-dimensional model.

The shape fitting may refer to estimating the shape of the surface of the three-dimensional model according to the reconstructed three-dimensional model, which reflects the degree of body fatness, the degree of different muscles, and the like. Optionally, the shape fitting may adopt a principal component analysis (PCA) method. Optionally, the shape fitting may be performed after the pose fitting.

Optionally, the to-be-measured body circumference comprises at least one of a chest circumference, a waistline and a hip circumference. For example, when the chest circumference is measured, feature measurement marking points on a chest circumference line of the measured three-dimensional model are recorded. After the human body fitting, the fitted heights of these feature measurement marking points are calculated on the three-dimensional model obtained by fitting, and a parallel surface of the fitted heights is crossed with a scanned trunk position of the three-dimensional model of the measured human body to obtain the envelope curve of the cross section, and the obtained envelope curve of the cross section is a measured chest circumference value.

Optionally, feature measurement markers with different shapes may be designed according to different measurement applications, for example, a feature measurement marker may be a linear segment, a curve segment, etc.

Compared with the device of finding feature points in the prior, the device disclosed by the embodiment of the present invention has the advantages that the measurement method based on fitting of the present invention is high in speed, stable and reliable in result and high in expandability.

Figure 9:
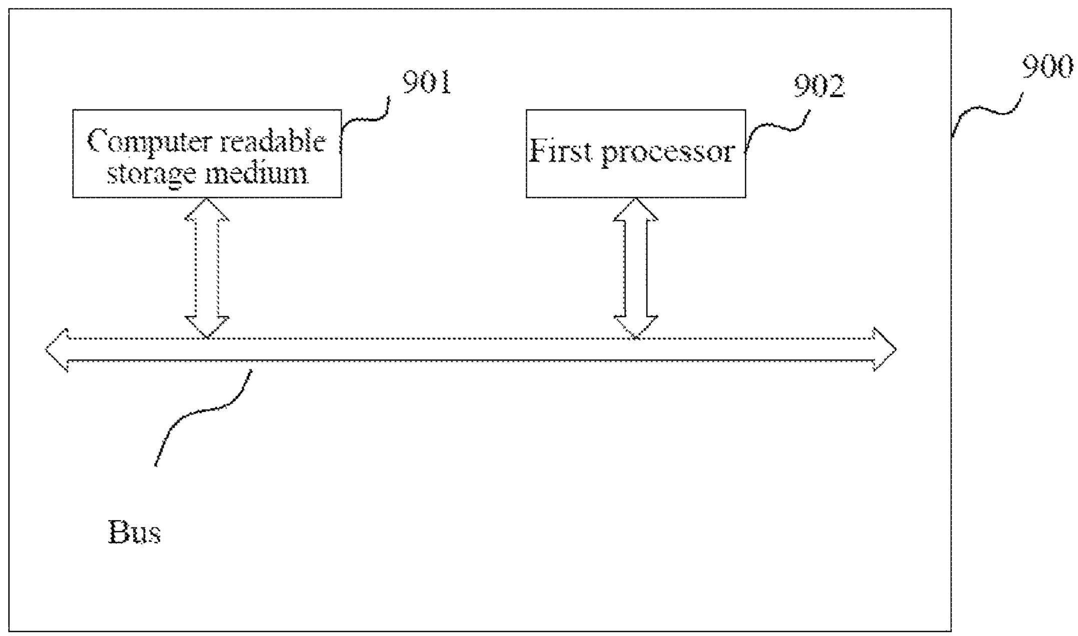
FIG. 9 is a structural schematic diagram of a device for three-dimensional reconstruction or measurement provided by embodiment 5 of the present invention.

A device 900 for three-dimensional reconstruction or measurement provided by embodiment 5 of the present invention will be specifically described below in combination with FIG. 9. The device comprises a computer readable storage medium 901, which stores a computer program, wherein the computer program, when executed by a first processor 902, implements the steps of the method in embodiment 1 or embodiment 2. As shown in FIG. 9, optionally, the device 900 may comprise a bus.

By adoption of the device for three-dimensional reconstruction provided by the embodiment of the present invention, during the reconstruction of three-dimensional images, the reconstruction effect of the three-dimensional images of the top and the bottom of the target object can be improved, and the precision of the reconstructed three-dimensional images is improved. Compared with the device of finding feature points in the prior, the device disclosed by the embodiment of the present invention has the advantages that the measurement method based on fitting of the present invention is high in speed, stable and reliable in result and high in expandability.

Figure 10:
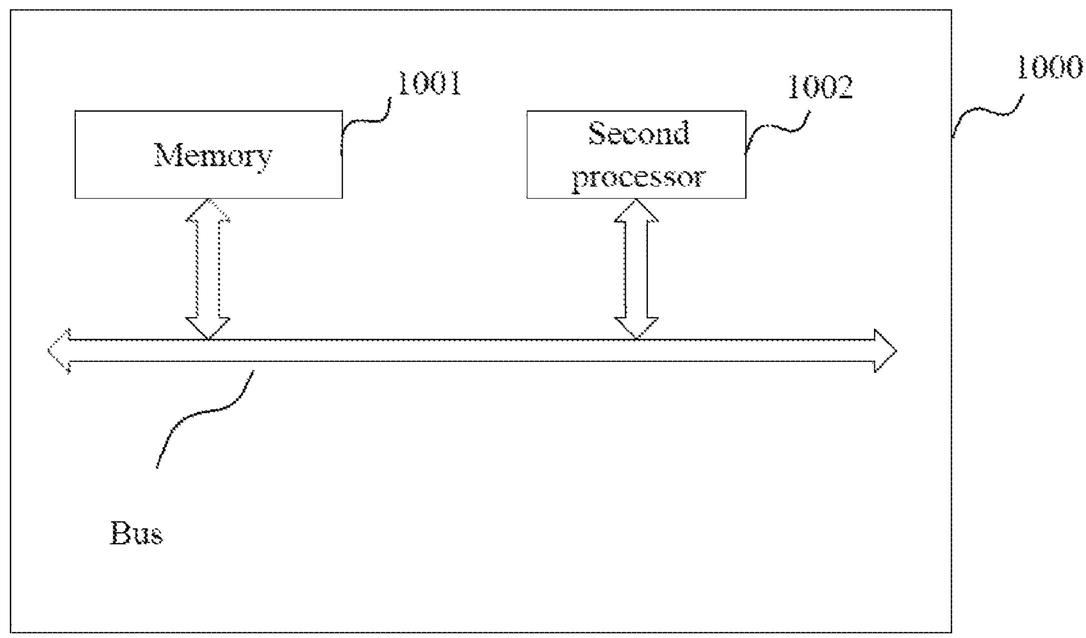
FIG. 10 is a structural schematic diagram of a device for three-dimensional reconstruction or measurement provided by embodiment 6 of the present invention.

A device 1000 for three-dimensional reconstruction or measurement provided by embodiment 6 of the present invention will be specifically described below in combination with FIG. 10. The device comprises a memory 1001, a second processor 1002 and a computer program which is stored in the memory 1001 and can be run on the second processor 1002, wherein the computer program, when executed by the second processor 1002, implements the steps of the method in embodiment 1 or embodiment 2. Optionally, as shown in the figure, the device 1000 may comprise a bus.

By adoption of the device for three-dimensional reconstruction provided by the embodiment of the present invention, during the reconstruction of three-dimensional images, the reconstruction effect of the three-dimensional images of the top and the bottom of the target object can be improved, and the precision of the reconstructed three-dimensional images is improved. Compared with the device of finding feature points in the prior, the device disclosed by the embodiment of the present invention has the advantages that the measurement method based on fitting of the present invention is high in speed, stable and reliable in result and high in expandability.

Exemplarily, the computer program may be segmented into one or more modules/units, and the one or more modules/units are stored in the memory and executed by the processor to accomplish the present invention. The one or more modules/units may be a series of computer program instruction segments which can achieve specific functions, and the instruction segments are used for describing the execution process of the computer program in the device/terminal equipment.

The device/terminal equipment may be computing equipment such as a mobile phone, a tablet computer, a desktop computer, a notebook computer, a palm computer, a cloud server or the like. The device/terminal equipment may comprise, but not limited to, a processor or a memory. It could be understood by those skilled in the art that the schematic diagrams of the present invention are merely examples of the device/terminal equipment, instead of limiting the device/terminal equipment, which may comprise more or less components than in the diagrams, or combine some components or different components, e.g., the device/terminal equipment may further comprise input/output equipment, network access equipment, a bus, etc.

The foregoing processor may be a central processing unit (CPU), and may also be other general processor, a digital signal processor (DSP), an application specific integrated circuit (ASIC), a field-programmable gate array (FPGA) or other programmable logic device, a discrete gate or transistor logic device, a discrete hardware component, etc. The general processor may be a microprocessor or any conventional processor or the like, and the processor is a control center of the device/terminal equipment and connects all parts of the whole device/terminal equipment by using various interfaces and lines.

The memory may be configured to store the computer program and/or modules, and the processor achieves various functions of the device/terminal equipment by running or executing the computer program and/or modules stored in the memory and calling data stored in the memory. The memory may comprise a program storage area and a data storage area, wherein the program storage area may store an operating system, an application program required by at least one function (e.g., image playing function, etc.), etc.; and the data storage area may store data (e.g., video data, images, etc.) created according to the use of the mobile phone. Moreover, the memory may comprise a high-speed random access memory, and may also comprise a non-volatile memory such as a hard disk, a memory or a plug-in hard disk, a smart media card (SMC), a secure digital (SD) card, a flash card, at least one hard disk storage device, a flash device, or other non-volatile solid-state storage device.

When the modules/units integrated in the device/terminal equipment are implemented in the form of software functional units and sold or used as independent products, they may be stored in a computer readable storage medium. Based on such an understanding, all of or part of processes in the methods of the above-mentioned embodiments of the present invention may also be implemented with a computer program instructing corresponding hardware. The computer program may be stored in a computer readable storage medium. The computer program, when executed by the processor, can implement the steps of the method embodiments described above. The computer program comprises computer program codes, which may be in the form of source codes, object codes or executable files, or in some intermediate forms, etc. The computer readable medium may comprise any entity or device which can carry the computer program codes, a recording medium, a USB flash disk, a mobile hard disk, a magnetic disk, an optical disk, a computer memory, a read-only memory (ROM), a random access memory (RAM), an electric carrier signal, an electrical signal, a software distribution medium, etc.

Imaging of the target object in the embodiments described above may be partial imaging or integral imaging of the target object. Whichever of the partial imaging or the integral imaging, or a corresponding adjustment made to the partial imaging or the integral imaging is adopted is applicable to the method or device provided by the present invention. The foregoing adjustment made by those of ordinary skill in the art without any creative effort shall fall into the protection scope of the present invention.

What is claimed is:

1. A method for three-dimensional reconstruction, comprising:

obtaining a first depth map, which is photographed by a first photographic device;

obtaining a second depth map, which is photographed by a second photographic device;

merging the first depth map with a first three-dimensional model according to a position of the first photographic device to obtain a second three-dimensional model; and merging the second depth map with the second three-dimensional model according to a position of the second photographic device to obtain a third three-dimensional model, wherein the position of the second photographic device is calculated by:

obtaining an initial position of the second photographic device according to the position of the first photographic device and a relative position between the second photographic device and the first photographic device; and using an iterative closest point algorithm, aligning the second depth map and the second three-dimensional model according to an initial position of the first photographic device to obtain the position of the second photographic device.

2. The method according to claim 1, wherein:

merging the first depth map with a first three-dimensional model according to a position of the first photographic device to obtain a second three-dimensional model comprises updating a signed distance function according to the position of the first photographic device and the first depth map to obtain a first signed distance function, wherein the first signed distance function comprises the second three-dimensional model; and merging the second depth map with the second three-dimensional model according to a position of the second photographic device comprises updating the first signed distance function according to the position of the second photographic device and the second depth map to obtain a second signed distance function, wherein the second signed distance function comprises the third three-dimensional model.

3. The method according to claim 1, wherein the position of at least one of the first photographic device and the second photographic device is obtained according to a calibration result.

4. A device for three-dimensional reconstruction, characterized by comprising:

an obtaining module, configured to obtain:

a first depth map, which is photographed by a first photographic device; and a second depth map, which is photographed by a second photographic device; and a calculation module, configured to:

merge the first depth map with a first three-dimensional model according to a position of the first photographic device to obtain a second three-dimensional model; and merge the second depth map with the second three-dimensional model according to a position of the second photographic device to obtain a third three-dimensional model, wherein the calculation module is further configured to:

obtain an initial position of the second photographic device according to the position of the first photographic device and a relative position between the second photographic device and the first photographic device; and using an iterative closest point algorithm, aligning the second depth map and the second three-dimensional model according to an initial position of the first photographic device to obtain the position of the second photographic device.

5. The device according to claim 4, wherein the calculation module is configured to:

update a signed distance function according to the position of the first photographic device and the first depth map to obtain a first signed distance function, wherein the first signed distance function comprises the second three-dimensional model; and update the first signed distance function according to the position of the second photographic device and the second depth map to obtain a second signed distance function, wherein the second signed distance function comprises the third three-dimensional model.

6. The device according to claim 4, wherein the position of at least one of the first photographic device and the second photographic device is obtained according to a calibration result.

7. A non-transitory computer readable storage medium, which stores a computer program, wherein the computer program, when executed by a processor, implements the steps of claim 1.

8. A device for image processing, comprising: a memory, a processor, and a computer program which is stored in the memory and can be run on the processor, wherein the computer program, when executed by the processor, implements the steps of the method of claim 1.

* * * * *